Feb. 21, 1928.
G. J. STOCKER
1,659,926
MAIN DISTRIBUTING WATER TROUGH FOR COOLING TOWERS AND THE LIKE
Filed Aug. 10, 1923
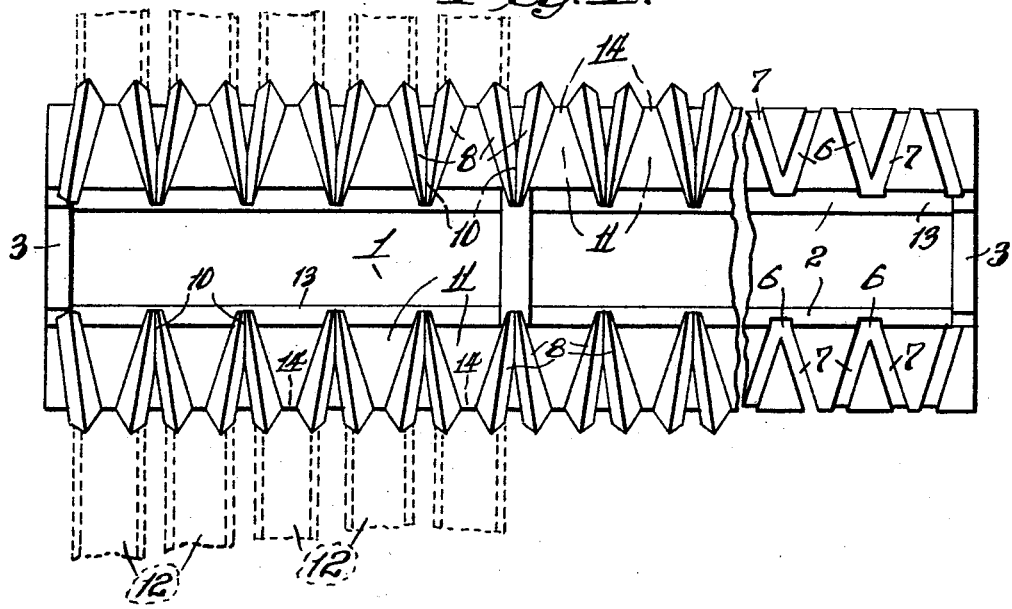
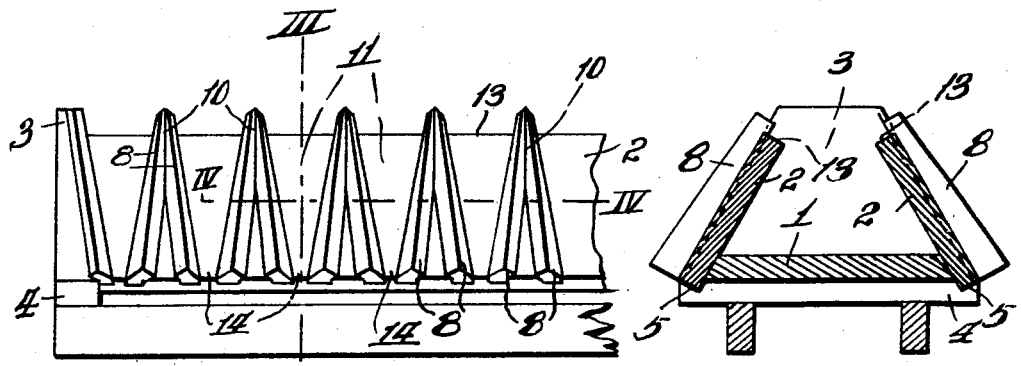
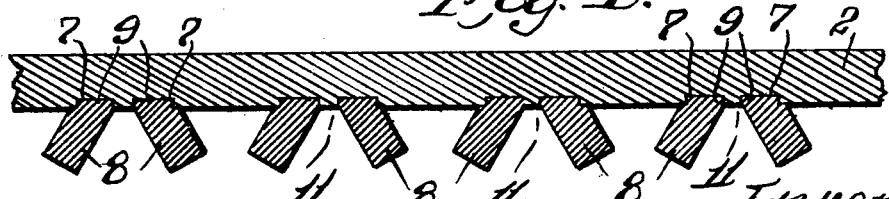
Inventor:
George J. Stocker.
By H. G. Fletcher
atty.

Patented Feb. 21, 1928.

1,659,926

UNITED STATES PATENT OFFICE.

GEORGE J. STOCKER, OF ST. LOUIS, MISSOURI.

MAIN DISTRIBUTING WATER TROUGH FOR COOLING TOWERS AND THE LIKE.

Application filed August 10, 1923. Serial No. 656,764.

This invention relates to an improvement in water troughs for cooling towers and more particularly pertains to the main distributing water troughs of the tower which feeds the auxiliary distributing troughs to the checker-work of the tower, the main purpose thereof being to provide a trough of an improved construction in which the water is permitted to overflow the sides thereof.

Another object of the invention is in providing a main distributing water trough with an improved arrangement of guiding vanes which are arranged on the sides of the trough for directing the overflowing water to the auxiliary distributing troughs.

A further object of the invention is in providing the main distributing water trough of a cooling tower with inclining side walls for the water overflow and with improved means upon the sides of the trough for directing the overflow.

Other and further objects will appear in the specification and be specifically pointed out in the appended claims, reference being had to the accompanying drawings, exemplifying the invention, and in which:—

Figure 1 is a plan view of this improved main distributing water trough having an intermediate portion thereof broken away and showing a portion of the trough partly assembled.

Figure 2 is a fragmentary side elevation of Fig. 1.

Figure 3 is a transverse vertical section taken on the line III—III of Fig. 2.

Figure 4 is an enlarged fragmentary horizontal section taken on the line IV—IV of Fig. 2.

Referring by numerals to the accompanying drawings this improved trough is preferably constructed of wood and is comprised of a bottom 1 which is enclosed by upwardly and inwardly inclining side walls 2 and secured between adjacent ends of said side walls are respective end members 3.

Cross members such as 4 are arranged for the support of the bottom 1, said cross members being longer than the width of the bottom and are cut out at their ends as designated at 5 on the upper surface thereof, said cut out portions being for the support of the side walls 2 as shown more clearly in Fig. 3.

A series of approximately inverted V-shape grooves 6 are provided in the outer surface of each of the side walls 2, each inverted V-shape groove being comprised of a pair of angularly disposed grooves 7 which extend from the bottom to the top of each of the side walls and which join each other at the top as shown in Fig. 1. Each of said grooves is for the securing of a cleat or guiding vane 8 each of which is provided with a tongue 9 for engaging within a respective groove, said vanes when mounted in pairs of respective grooves wedging against each other at their upper ends as designated at 10 thereby providing a wedging lock for each pair of abutting vanes 8.

The pairs of guiding vanes 8 as shown are disposed in spaced relation to adjacent pairs thereby providing a valley 11 between each pair of guiding vanes 8, said valleys being wider at the upper end than at the lower end. Each pair of guiding vanes 8 is of a length so as to extend upwardly above the top of each of the side walls 2.

In the use of a device of this improved character, the mounting of the trough is uppermost above the auxiliary distributing troughs 12 as shown in Fig. 1, in which respective oppositely disposed pairs of valleys or pathways 11 of the respective side walls 2 will be disposed directly above the respective auxiliary troughs 12.

Water is supplied to the main distributing trough by piping means not shown, and inasmuch as the water supply to the main distributing trough is continuous when a cooling tower which this improved trough is a part of is in operation, the discharge of water from this improved trough will be by overflow over the top edges 13 of each of the side walls 2. The upwardly extending abutting ends of the pairs of guiding vanes 8 will divide the water overflow of each side wall, so that the overflowing water will flow into the several valleys or pathways 11 provided by the guiding members 8, the lower converging ends 14 of each passageway directing the overflowing water in relatively narrow streams to respective auxiliary troughs 12 from which the water will be discharged by overflowing or otherwise from said auxiliary troughs onto the checker-work not shown which is located beneath said auxiliary troughs.

Inasmuch as the end walls 3 of the trough extend above the side walls 2, the water can not overflow said end walls.

In a trough of this improved character which is constructed of wood, the durability of the trough for the purpose intended is obvious.

What I claim is:

1. A distributing trough for a cooling tower having oppositely disposed side walls which lean towards each other, guiding members arranged in pairs and abutting together at one end, said pairs of guiding members being secured to said side walls and spaced from one another so as to form guideways between adjacent pairs of guiding members for the directing of the water overflow from the trough.

2. A distributing trough for a cooling tower having oppositely disposed side walls which lean towards each other, guiding members arranged in pairs and abutting together at one end, said pairs of guiding members being secured to said side walls and spaced from one another so as to form guideways between adjacent pairs of guiding members for the directing of the water overflow from the trough, the abutting ends of said pairs of guiding members projecting above said side walls.

3. A distributing trough for a cooling tower having oppositely disposed side walls which lean towards each other and end walls projecting above said side walls, a series of angularly disposed guiding members secured to each of said side walls arranged so as to provide downward converging passageways on the outside of said walls, said guiding members projecting above the respective side walls to which they are secured so as to provide dividing members for water overflow from said trough.

4. A distributing trough for a cooling tower having oppositely disposed side walls which lean towards each other and end walls projecting above said side walls, a series of angularly disposed grooves formed on the outside of each of said side walls, a guiding member mounted in each of said grooves, said guiding members providing downwardly converging passageways on the outside of each of said side walls for the reception of the water overflow from said trough, said guiding members projecting above the respective side walls to which they are secured so as to provide dividing members for water overflow from said trough.

5. A distributing trough for a cooling tower having side-walls over which the water from the trough overflows, one of said walls being provided with a plurality of inverted V-shaped grooves, and a guiding member secured in the leg of each V-shaped groove for dividing and directing the water flow from the trough.

6. A distributing trough for a cooling tower having oppositely disposed side walls which lean towards each other and end walls, each of said side walls having a series of grooves formed in the outside thereof, a guiding member mounted in each of said grooves, said grooves and the guiding members therein being disposed so as to provide converging passageways for the reception of the water flow from the trough, said guiding members projecting above respective side walls.

GEORGE J. STOCKER.